(12) United States Patent
Cohen et al.

(10) Patent No.: US 9,286,303 B1
(45) Date of Patent: Mar. 15, 2016

(54) UNIFIED CATALOG SERVICE

(75) Inventors: Jeffrey Ira Cohen, Sunnyvale, CA (US); King Lun Choi, Palo Alto, CA (US); Brian C. Hagenbuch, Annapolis, MD (US); Kurt Harriman, Novato, CA (US); Charles F. McDevitt, Belmont, CA (US); Gavin John Sherry, Beaune (FR); Caleb E. Welton, Foster City, CA (US)

(73) Assignee: EMC Corporation, Hopkinton, MA (US)

( * ) Notice: Subject to any disclaimer, the term of this patent is extended or adjusted under 35 U.S.C. 154(b) by 190 days.

(21) Appl. No.: 13/335,459

(22) Filed: Dec. 22, 2011

(51) Int. Cl.
*G06F 17/30* (2006.01)

(52) U.S. Cl.
CPC .... *G06F 17/30091* (2013.01); *G06F 17/30607* (2013.01)

(58) Field of Classification Search
CPC .............. G06F 17/30067; G06F 17/30566; G06F 17/30091; G06F 17/3002; G06F 17/30607
USPC ......... 707/740, 610, 640, 687, 736, 748, 822, 707/725, 1, 100, 803
See application file for complete search history.

(56) References Cited

U.S. PATENT DOCUMENTS

| | | | | |
|---|---|---|---|---|
| 7,558,927 B2* | 7/2009 | Clark et al. | ................ | 711/162 |
| 7,693,900 B2* | 4/2010 | Wilmering et al. | ........... | 707/713 |
| 7,711,702 B2* | 5/2010 | Smolen et al. | ................ | 707/715 |
| 7,711,703 B2* | 5/2010 | Smolen et al. | ................ | 707/609 |
| 7,739,290 B2* | 6/2010 | Rossmann | ................... | 707/755 |
| 7,860,838 B2* | 12/2010 | Gupta et al. | ................ | 707/651 |
| 7,937,387 B2* | 5/2011 | Frazier et al. | ................ | 707/722 |
| 8,051,094 B2* | 11/2011 | Agrawal et al. | ............... | 707/770 |
| 8,055,692 B2* | 11/2011 | Horn | ............................. | 707/829 |
| 8,135,914 B2* | 3/2012 | Iyigun et al. | ................. | 711/118 |
| 8,166,076 B2* | 4/2012 | Chen et al. | ................... | 707/803 |
| 8,171,337 B2* | 5/2012 | Peters et al. | ................... | 714/6.2 |
| 8,402,071 B2* | 3/2013 | Skillcorn | ...................... | 707/822 |
| 8,499,121 B2* | 7/2013 | Tolia et al. | ................... | 711/118 |
| 2005/0160076 A1* | 7/2005 | Kanemasa | ........................ | 707/2 |
| 2010/0042629 A1* | 2/2010 | Fukatani et al. | ................ | 707/10 |
| 2010/0251010 A1* | 9/2010 | Peters et al. | .................... | 714/5 |
| 2011/0022627 A1* | 1/2011 | Mohan | .......................... | 707/769 |
| 2012/0023319 A1* | 1/2012 | Chin et al. | ......................... | 713/2 |
| 2012/0317155 A1* | 12/2012 | Ogasawara et al. | ........... | 707/812 |

OTHER PUBLICATIONS

Chattopadhyay et al., Tenzing A SQL Implementation on the MapReduce Framework, Aug. 2011.

* cited by examiner

*Primary Examiner* — Dangelino Gortayo
(74) *Attorney, Agent, or Firm* — Van Pelt, Yi & James LLP

(57) ABSTRACT

A catalog of one or more metadata objects associated with metadata is stored in a persistent manner. The data objects are stored at least in part on a user node included in a data management system. A request associated with accessing a metadata object included in the persistent catalog is received. In response to receiving the request, access to the requested metadata object is provided.

24 Claims, 5 Drawing Sheets

UNIFIED CATALOG SERVICE

BACKGROUND OF THE INVENTION

FIG. 1 is a diagram showing an example of a distributed data management system. In the example shown, there are N user nodes (including user nodes 106 and 108) which are connected to a master node (100) via a network (104). Master node 100 includes a catalog (102) which contains metadata. Metadata is data about data and may (for example) describe the state of the system and/or the contents of user data in databases 110 and 112, such as properties, characteristics, attributes, features associated with the system (including user data or metadata in the system), or functions which are available and/or permitted to be performed on data objects and/or metadata objects. Copies of portions of catalog 102 are stored locally on the user nodes in a persistent manner in segments 114 and 116. For example, metadata may include processes or functions and if it is desired for that process to be performed at user node 106 on local data (e.g., user data 110), then segment 114 may include that function. In order to ensure that the system behaves properly, segments 114 and 116 must be synchronized with the catalog. Administratively, this and other management tasks may be difficult. For example, if a process in catalog 102 is updated, it must be ensured that the update is also propagated to segments 114 and 116 as needed. In some cases there is an automated process for doing this, but it is not a complete solution (e.g., it was assembled ad hoc and not all processes are copied by the code), it is not feasible to do a full replication, and/or the code is disorganized and thus it is difficult to update (e.g., if a new user node is added or a new process is added which needs to be synchronized across master node and user nodes). As such, an update may not be performed properly and may require manual intervention at a user node by an expert administrator. In the meantime, user data at the user node may be unavailable, which may disrupt work. New data management systems which are easier to manage would be desirable.

BRIEF DESCRIPTION OF THE DRAWINGS

Various embodiments of the invention are disclosed in the following detailed description and the accompanying drawings.

DETAILED DESCRIPTION

Figure 1:
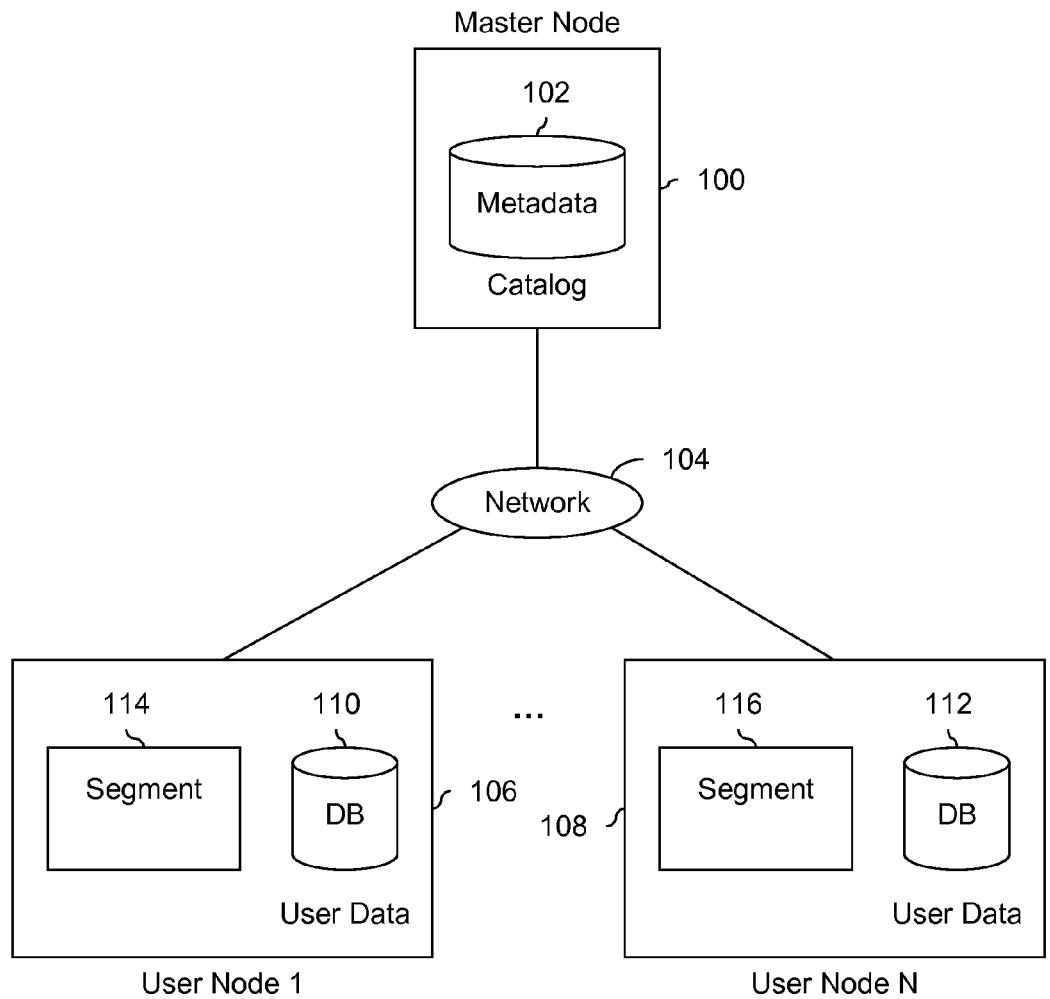
FIG. 1 is a diagram showing an example of a distributed data management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A persistent catalog of metadata which is located on a catalog node is described herein. The catalog node is part of a distributed data management system which also includes a master node and a user node. User nodes in the data management system which desire access to metadata obtain it directly from a catalog stored on the catalog node, as opposed to managing and maintaining a persistent collection of metadata locally on the user node. In some embodiments, a temporal copy of metadata is stored locally in a cache on a user node; in such embodiments the copy is neither persistent nor a link by which a corresponding metadata object in a catalog can be updated, thus reducing synchronization issues. In some embodiments, a catalog is associated with multiple data management systems and the catalog presents a unified representation of metadata from multiple sources. For example, even though a catalog may contain metadata about a Hadoop database as well as metadata about a Greenplum database, the metadata is stored in the catalog in a unified schema and presented to a requester in this unified schema. In some other embodiments, multiple data management systems associated with the same catalog are instantiations of the same type of system (i.e., just as a standard relational database management system (RDBMS) can contain the data for multiple users, a catalog node can contain multiple catalogs for a collection of separate database instances). In some embodiments, a given catalog node contains multiple versions of a catalog associated with different versions or instantiations of the same data management system.

Figure 2:
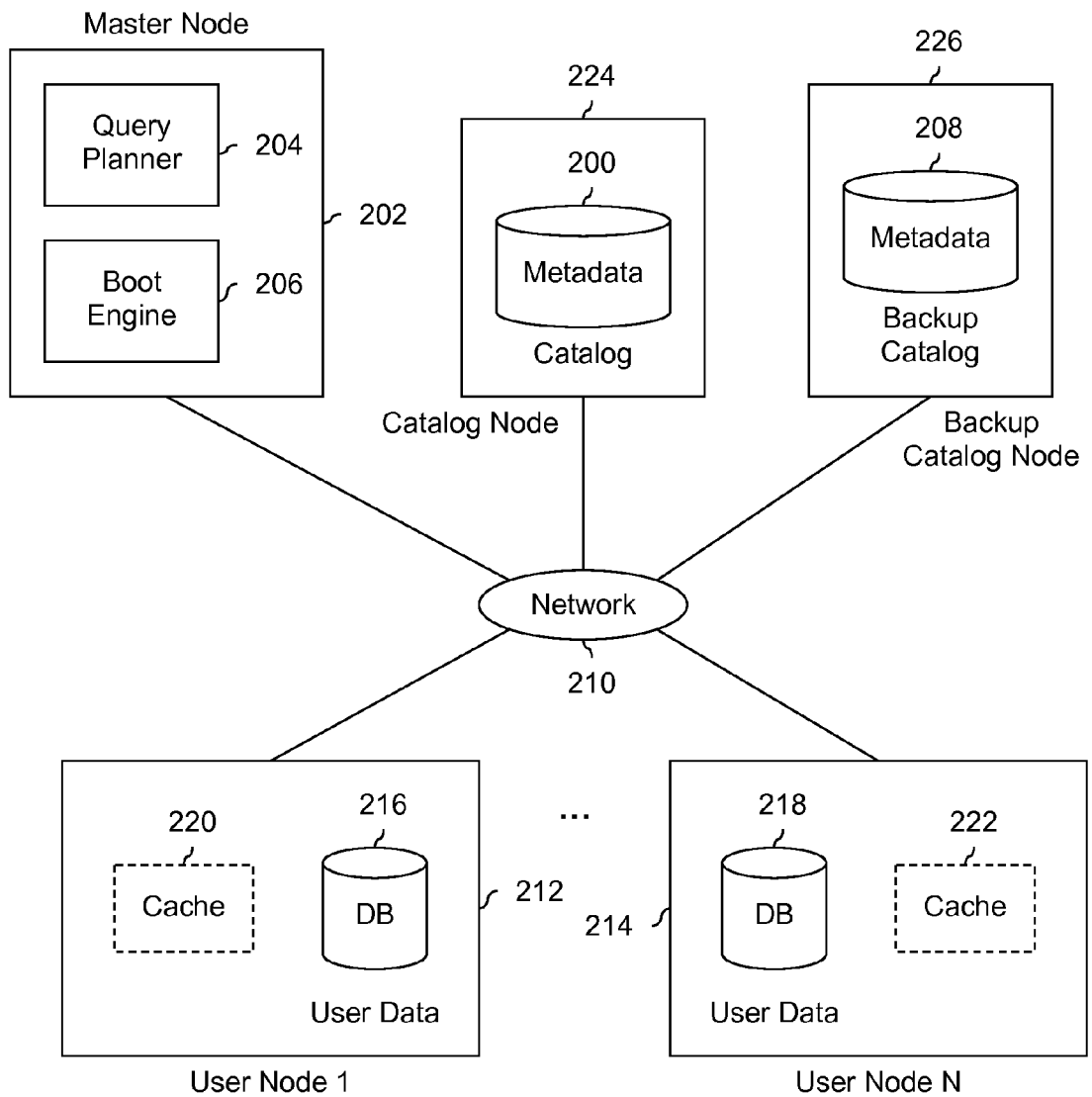
FIG. 2 is a diagram showing an embodiment of a distributed data management system where a catalog is located on a catalog node.

FIG. 2 is a diagram showing an embodiment of a distributed data management system where a catalog is located on a catalog node. In the example shown, catalog 200 is located on catalog node 224, as opposed to master node 202 or one of user nodes 106 or 108. In this example, a catalog is a persistent collection of metadata. Metadata describes characteristics, parameters, relationships, and/or properties of a data management system, such as the design and specification of a database or data structures within a database. Some examples of metadata which may be stored in catalog 200 include (but are not limited to): what type of database a particular database is; how information is arranged or stored in a database (e.g., column orientation versus row orientation); the types, properties, domains, and characteristics of the columns of the tables in the database, and the relationships of the tables in the database, mechanisms for accessing a data structure such as a process, operation or function which is available and/or are permitted to be performed on a data structure; etc. Metadata is implementation dependent and one type of a data management system may employ a different set or schema of metadata compared to another type of data management system; the techniques described herein are not limited to a particular implementation. Similarly, although some examples described herein use the term "catalog" (which, along with the synonym "data dictionary", may be associated with SQL databases), the technique is not limited to catalogs or to SQL databases.

The data management system shown in this example is a distributed system where data is distributed throughout the system, as opposed to being located in one (for example, central) location. In this example, user data is stored on user nodes 212 and 214 as user data 216 and 218, respectively. Although not shown in this example, in some embodiments a master node includes some data managed by the data management system. In various embodiments, a data management system is a file system, a database (e.g., distributed or centralized), etc.

Cache 220 and 222 are used to store temporary copies of metadata objects from catalog 200. Using such a cache may offer performance improvements, for example in cases where a copy of a desired metadata object is contained in the cache (i.e., a cache hit). A cache is used, in one example, for a process to be performed on user node 212, and that process is stored in metadata. Cache 220 is accessed to determine if that metadata object (i.e., the process) is stored on user node 212. If it is, then the process (i.e., metadata object) from cache 220 is used. Otherwise, catalog 200 on catalog node 224 is accessed via network 210. A variety of cache management techniques may be used, for example, to detect stale information in the cache and remove it once it is detected. In some embodiments, a cache is used on a master node. In some embodiments, caches are not used and a process on a local node or a master node sends a request for a metadata object directly to a catalog (i.e., there is no check first to see if it is available locally). In some embodiments a cache is a write-through cache, where updates to the cache propagate automatically to the catalog (e.g., some mechanism synchronizes or invalidates the caches in the system). A cache on a user node is optional and in some embodiments is not included.

In this example, no persistent copy of a metadata object from catalog 200 is stored on and/or managed by user nodes 212 and 214 in cache 220 or 222, respectively. This eliminates the synchronization issues associated with keeping a persistent copy on a user node with a corresponding metadata object in catalog 200. For example, if some metadata is stored locally and persistently in the form of segments on a local device, then during an upgrade it will be necessary to ensure that the update is performed on all relevant segments in addition to the catalog. The timing of the update is also consideration and it may be necessary to ensure that the change is performed simultaneously across all devices. Similarly, if a new user node is spawned, there is no need to construct and populate a persistent local metadata store.

In some embodiments, a first service or data management system is used to manage and/or store catalog 200 on catalog node 224 and a second service or data management system is used to manage and/or store information on master node 202 and user nodes 212 and 214. For example, suppose a first database system which is optimized to manage a relatively small amount of information stored centrally is used to store and manage catalog 200 on catalog node 224, and a second database system which is optimized to manage a relatively large amount of information stored in a distributed manner is used to store and manage user data 216 and 218 (and possibly other information as desired). To illustrate how such an arrangement may be useful, consider that requests for metadata objects may be small requests (i.e., asking for small amounts of information to be moved or returned) and expedited answers would be desirable. However, user data 216 and 218 may contain massive amounts of information (e.g., an enterprise data warehouse). Requests for the latter may include dealing with much, much larger amounts of information (e.g., a request to move or return receipt information for all stores nationwide in a retail chain). Using two services and/or data management systems permits different types of databases, configurations, settings, availability guarantees, and/or optimizations to be employed which are selected based on the different inherent properties and desired performance goals associated with the information being managed. For example, configuration of a database used to store and manage catalog 200 occurs independent of user data 216 and 218, so things like the amount of user data 216 and 218 or desired performance or availability goals associated with user data will not adversely affect the configuration of a database used to store and manage the catalog.

In some embodiments, catalog 200 manages and stores metadata associated with multiple data management systems. For example, user node 212 may be associated with a Greenplum database system and user node 214 may be associated with a Hadoop system. Catalog 200 may manage and store information for both the Greenplum database and the Hadoop database, receiving and responding to requests for access to metadata objects associated with the Greenplum and Hadoop systems. Other example data management systems include EMC systems, Oracle systems, Hive systems and Pig systems. In some embodiments, catalog 200 has a simplified and/or unified application programming interface (API) for catalog related services (e.g., to create, implement and/or manage a catalog). This may be attractive if there are multiple types of systems (as in the Greenplum and Hadoop example above), since a process which interfaces with such an API will have a consistent interface. So even though metadata may be associated with different types of sources (such as Greenplum, Hadoop, etc.), there may be a common or unified organization or schema associated with the metadata managed by the catalog.

In some embodiments, catalog 200 is used as an add-on or replacement to some other catalog. For example, a company may purchase a data management system from a first software provider which is associated with master node 202 and user nodes 212 and 214. Although the data management system associated with the first software provider includes an out-of-the-box catalog, the services provided may be inconvenient to use or lacking in some way. Catalog 200 may be provided by another software provider as a replacement for the out-of-the-box catalog and may provide a richer set of services or features compared to the out-of-the-box catalog. For example, a company may implement a Hadoop data management system, but supplement the Hadoop system with a Greenplum catalog service which is used in place of the Hadoop catalog. In some embodiments, an out-of-the-box catalog is stored on a master node and an administrator wants the catalog to be located on some other node than the master node (e.g., catalog node 224). In some embodiments, an administrator is able to specify what node is the catalog node (i.e., what node to install catalog 200 on).

In addition to user nodes 212 and 214, master node 202 may access metadata stored in catalog 200. Master node 202 includes query planner 204 and boot engine 206. In this example, query planner 204 performs a variety of query related processes, including: assembling a raw query to be performed on user data 216 and/or 218, optimizing the raw query, and executing (and/or dispatching the distributed execution of) the optimized query on the target user data. Some or all of the steps involve accessing catalog 200 (e.g., metadata may describe what operations are available for or are permitted to be executed on user data in order to assemble a raw query, or metadata may describe features or characteristics about how the data is provided or organized which may enable performance improvements or other optimizations). Query planner 204 may have a pointer, reference or address associated with catalog 200 and directs access requests for metadata to catalog 200 and catalog 200 provides access to the requested metadata.

Master node 202 further includes boot engine 206, which is associated with a boot process. In one example, boot engine 206 is initiated when master node 202 is powered on (e.g., when an underlying hardware system such as a computer or server is powered on). At such times, master node 202 may begin in a relatively primitive state with very basic processing capabilities and minimal knowledge of the data management system (e.g., described by state information which may be stored in catalog 200). Boot engine 206 may begin a process of acquiring knowledge about the system and expanding its processing capabilities. This boot process may involve accessing catalog 200 (for example) because the catalog describes what type of data management system the system is, where important system components are located (e.g., a root node or index), and/or other important identifying information about the system.

In some embodiments, master node 202 provides additional and/or alternative services to those described above. For example, a master node may function as an interface, service or access point by which users interface with the distributed management system shown. In such embodiments, an interface or communications process (not shown) may be performed on master node 202.

Backup catalog 208 on backup catalog node 226 is used in some embodiments as a substitute for catalog 200 as desired or needed. In some embodiments, a redirection to a backup catalog occurs by redirecting a process (e.g., on one of the user nodes 212 or 214 or on master node 202) to backup catalog 208, for example, by updating a link, address or identifier associated with the catalog. In some embodiments, backup catalog 208 is used when catalog 200 is brought down for service maintenance or a hardware upgrade, or when catalog 200 fails. In this particular example, backup catalog 208 and catalog 200 are on different devices to increase the likelihood that backup catalog 208 is available if catalog 200 fails. If backup catalog 208 were on the same device, then in some situations the backup catalog might not be available if catalog node 224 fails entirely.

In various embodiments, network 210 includes any number and/or types of networks spanning any distance. In various embodiments, the devices shown are spread out across different regions. For example, user node 212 may be located in Seattle and user node 214 is located in San Francisco. Various examples of networks that may be used include storage area networks (SAN), Ethernet networks, etc.

A benefit to the system shown in this embodiment is demonstrated during the boot process, especially with respect to the updating of a catalog. In monolithic systems where the catalog is on the master node, it is risky to upgrade certain parts of the catalog, for example those portions that are accessed by boot engine 206 during a boot process, such as system state information. If a change (for example, to system state information) causes the system to hang or freeze in the middle of the boot process, it may be extremely difficult or impossible to recover because the master node cannot get to a state where the catalog is accessible and tools are available to correct the change in the catalog. For example, the master node may not be in a state where the catalog can be accessed and presented to an administrator for manual editing or rollback to a good version. An administrator is, in essence, locked out of the system. Although not making any change to a catalog is one way to prevent this problem from occurring, that solution is not attractive since a catalog would be locked into the state it was in when first created.

In contrast, changes to catalog 200 in FIG. 2 do not affect a boot engine (not shown) on catalog node 224. Even if a change to catalog 200 causes boot engine 206 on master node 202 to freeze, any such change will not affect a boot engine on catalog node 224 and an administrator will not be locked out of catalog node 224. Catalog node 224 is in a state where catalog 200 could be accessed and modified as needed (e.g., an administrator performs a manual edit to catalog 200). Alternatively, instead of accessing catalog node 224 and making a fix to metadata 200, in some embodiments catalog node 224 is brought down and backup catalog node 226 with a functioning (e.g., earlier) version of backup catalog 208 is brought up so that boot engine 206 accesses backup catalog 208 on backup catalog node 226 instead of catalog 200 on catalog node 224. For example, if master node 202 includes a pointer or reference to catalog node 224, then backup catalog node 226 may assume the identity of catalog node 224 on the network or system so that a pointer or reference points to backup catalog node 226. In either case, such solutions are not possible in a monolithic system where a catalog is located on the master node.

In some embodiments, master node 202 is based on or developed from a legacy monolithic system where the catalog resides on a master node and the catalog is highly intertwined with processes on the master node which access metadata stored in the catalog. In some such embodiments, modifications are made to decouple the catalog from other components on a master node. For example, a query planner or boot engine may expect a catalog to be on-device and access of metadata in processes or function calls may be structured or expressed as a local access (e.g., a location in hierarchy or an object identifier with no context or scope since the calling process and catalog may have the same or similar scope or context). Modifications may be made to a query planner or boot engine to support a catalog that is no longer on the same device (e.g., assembling a request for metadata where the request and returned metadata are exchanged over a network and specifying any required scope or context since the calling process and catalog are not on the same device).

A catalog which is located on a catalog node (as opposed to a master node) may enable a variety of applications. The following figure shows a multi-master system which uses a catalog on a catalog node. A multi-master system may be desirable since it may offer improved performance over a single master and may offer redundancy in the event a master fails.

Figure 3:
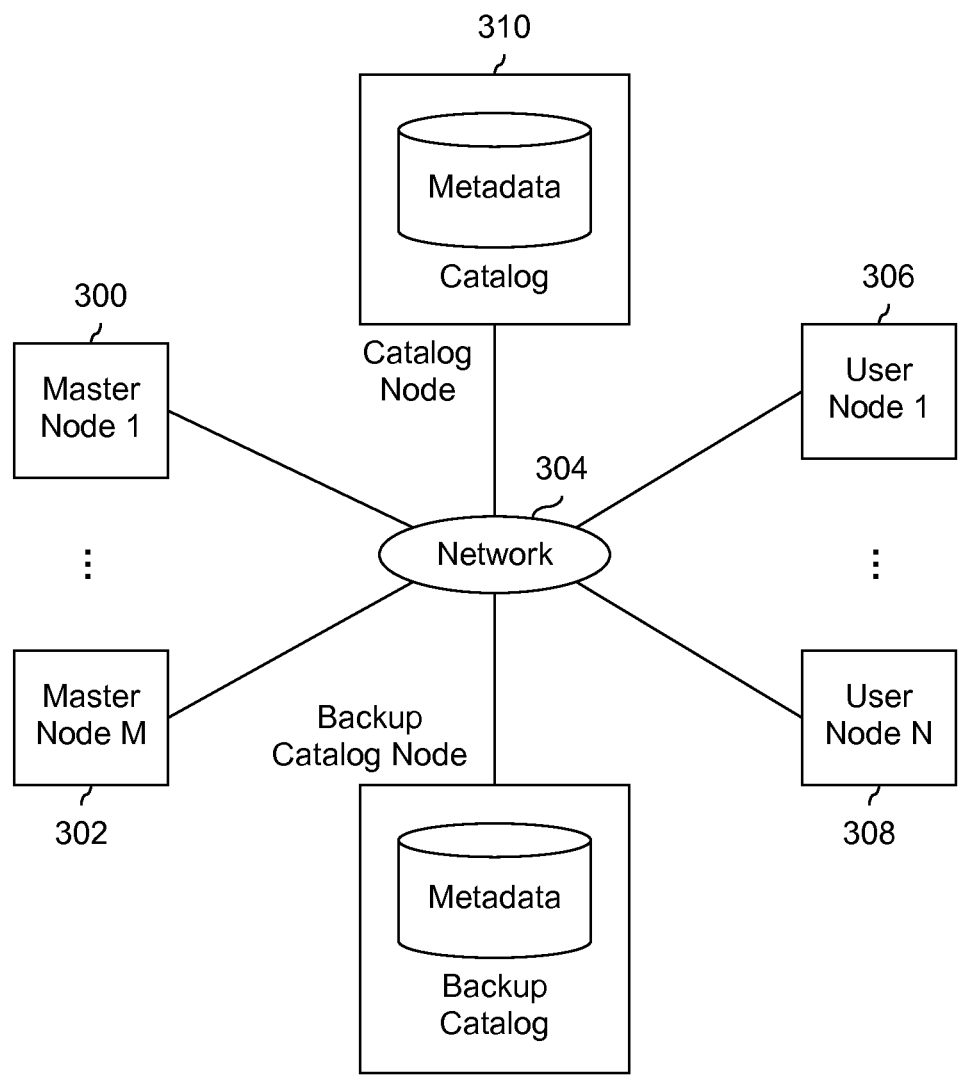
FIG. 3 is a diagram showing an embodiment of a multi-master distributed data management system.

FIG. 3 is a diagram showing an embodiment of a multi-master distributed data management system. In the example shown, there are M master nodes and N user nodes. In various embodiments, a system may include any number of master nodes and any number of user nodes. Master nodes 300 and 302 perform a variety of processes or functions, for example on one or both of user nodes 306 and 308. In some embodiments, master nodes 300 and 302 are identical. For example, the master nodes may be interchangeable and are used in a load sharing manner to process instructions in an interchangeable manner (e.g., whichever is free takes on the next task). In some embodiments, master node 300 has a different set of capabilities and/or responsibilities compared to master node 302. For example, master node 300 may be associated with tasks directed only to user node 306 and master node 302 may be associated with tasks directed only to user node 308 (the system may define which master node is responsible for tasks directed to both user nodes). In some embodiments, each master node services tasks which originate from or are otherwise associated with that master node.

Regardless of the responsibilities of and/or processes performed by master nodes 300 and 302, the master nodes do not maintain persistent copies of the metadata locally. In some embodiments, masters 300 and 302 maintain a cache (e.g., as described above with respect to the previous figure) but any metadata kept in such a cache is transient or temporal. In some embodiments, if there is no cache or a desired metadata object is not located in a cache on a master node, a request is sent to catalog node 310 for access to the desired metadata object. Similarly, user nodes 306 and 308 do not keep a persistent copy of metadata on their devices; any copy which is kept locally is stored in a temporary manner.

In some embodiments, the number of masters varies over time. For example, if more masters are needed because the load is heavy, additional master nodes may be instantiated; when they are no longer needed they are brought down. Since the master node no longer includes a catalog, it is relatively effortless to instantiate a master node (or alternatively bring it down) and adjust the number of masters as needed. For example, to bring up a new master in such monolithic systems would require duplication of the catalog on the master node. Some systems may not have fully automated tools to do this. Furthermore, in the event a master node is brought down, the corresponding catalog would come down but other nodes or processes might expect the catalog to be available, which could create problems.

Figure 4:
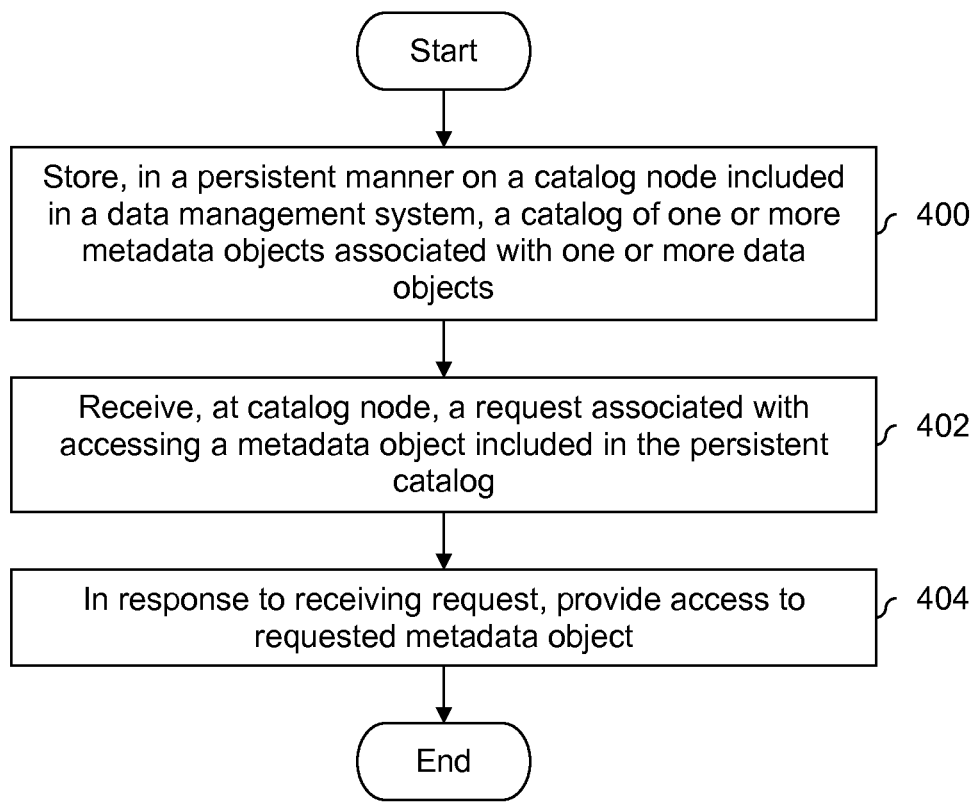
FIG. 4 is a flowchart illustrating an embodiment of a process for managing a catalog of metadata objects.

FIG. 4 is a flowchart illustrating an embodiment of a process for managing a catalog of metadata objects. In some embodiments, the process is performed by a catalog, for example catalog 200 in FIG. 2.

At 400, a catalog of one or more metadata objects associated with one or more data objects is stored in a persistent manner on a catalog node included in a data management system. For example, FIGS. 2 and 3 show examples of such a data management system.

At a catalog node, a request associated with accessing a metadata object included in the persistent catalog is received at 402. For example, catalog node 224 may receive a request from master node 202 or user node 212 or 214.

At 404, in response to receiving a request, access is provided to a requested metadata object. For example, master node 202 and user nodes 212 and 214 do not store persistent copies of metadata objects from the catalog locally.

Figure 5:
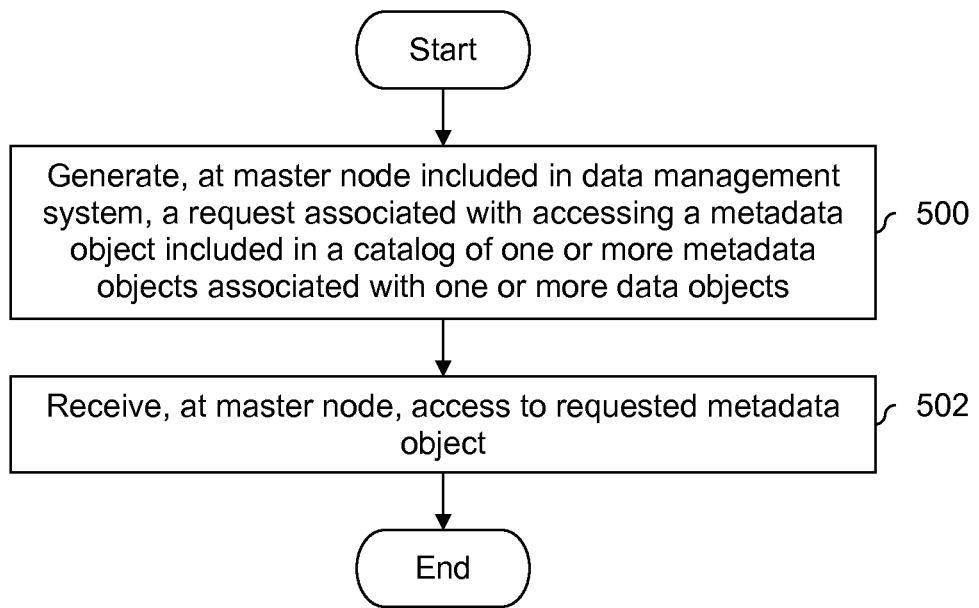
FIG. 5 is a flowchart illustrating an embodiment of a process for accessing a catalog of metadata objects.

FIG. 5 is a flowchart illustrating an embodiment of a process for accessing a catalog of metadata objects. In some embodiments, the process is performed by a user node, for example user node 212 or 214 in FIG. 2.

At 500, a request associated with accessing a metadata object is generated at a master node included in a data management system. The metadata object is included in a catalog of one or more metadata objects associated with one or more data objects and the catalog is stored in a persistent manner on a catalog node included in a data management system and data objects are stored at least in part on a user node included in the distributed data management system. In one example, query planner 204 on master node 202 in FIG. 2 is assembling, optimizing and/or executing a query and information stored in catalog 200 is used as part of this.

At 502, access to a requested metadata object is received at a master node. In some embodiments, neither a master node nor a user node is configured to store any metadata object from the catalog in a persistent manner. For example, even though query planner 204 in FIG. 2 may receive some metadata objects in order to assemble, optimize and/or execute a query, the metadata object obtained in order to do this is not stored persistently on the master node.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing stored objects, comprising:
a catalog node, including a processor and memory, that is configured to:
store, on the catalog node in a persistent manner, a catalog comprising one or more metadata objects, wherein:
the one or more metadata objects comprising the catalog include: (1) one or more metadata objects associated with a first data management system and (2) one or more metadata objects associated with a second data management system; and
the one or more metadata objects are stored in the catalog in a unified schema;
receive, at the catalog node, a first request to access a metadata object associated with the first data management system;
receive, at the catalog node, a second request to access a metadata object associated with the second data management system; and
in response to receiving the first and the second request, provide unified access to the requested metadata objects associated respectively with the first and the second data management system including by accessing the catalog and presenting the requested metadata objects in the unified schema;
a master node, including a processor and memory, wherein:
the master node includes a first boot engine that accesses, during the boot process of the master node, first system state information in the catalog and stored on the catalog node; and
the catalog node further includes a second boot engine that accesses,
during the boot process of the catalog node, second system state information different from the first system state information, such that a modification to the first system state information that causes the boot process on the master node to freeze does not cause the catalog node to freeze; and
a plurality of user nodes, including: (1) a first user node that is configured to store first user data using the first data management system and (2) a second user node that is configured to store second user data using the second data management system.

2. The system of claim 1, wherein the catalog is stored on the catalog node according to a set of system configurations that includes one or more of the following: a property associated with the catalog, an availability guarantee associated with the catalog, and a performance goal associated with the catalog.

3. The system of claim 1, wherein the first request and the second request are each received from one of the following: a boot engine, a query planner, a master node, or a user node.

4. The system of claim 1, wherein the second data management system includes an out-of-the-box catalog that is not used to provide catalog services.

5. The system of claim 4, wherein the out-of-the-box catalog is configured to be stored and managed on a master node associated with the second data management system.

6. The system of claim 1, wherein the first data management system includes a Greenplum database system and the second data management system includes a Hadoop system.

7. The system of claim 1, wherein the catalog node is further configured to: in the event a modification to the first system state information causes the boot process on the master node to freeze:
receive an instruction associated with a manual edit to the first system state information; and
using the catalog node modify the first system state information as instructed per the instruction associated with the manual edit.

8. The system of claim 1, further comprising a backup catalog node that includes an earlier version of the catalog before a modification to the first system state information causes the boot process on the master node to freeze, wherein the backup catalog node is configured to provide the first boot engine on the master node with access to the earlier version of the catalog during the boot process of the master node.

9. A method for managing stored objects, comprising:
using a catalog node to store, on the catalog node in a persistent manner, a catalog comprising one or more metadata objects, wherein:
the one or more metadata objects comprising the catalog include: (1) one or more metadata objects associated with a first data management system and (2) one or more metadata objects associated with a second data management system;
the one or more metadata objects are stored in the catalog in a unified schema; and
a plurality of user nodes includes: (1) a first user node that is configured to store first user data using the first data management system and (2) a second user node that is configured to store second user data using the second data management system;
receiving, at the catalog node, a first request to access a metadata object associated with the first data management system;
receiving, at the catalog node, a second request to access a metadata object associated with the second data management system;
in response to receiving the first and the second request, providing unified access to the requested metadata objects associated respectively with the first and the second data management system including by accessing the catalog and presenting the requested metadata objects in the unified schema;
using a first boot engine on a master node to access, during the boot process of the master node, first system state information in the catalog and stored on the catalog node; and
using a second boot engine on the catalog node to access, during the boot process of the catalog node, second system state information different from the first system state information, such that a modification to the first system state information that causes the boot process on the master node to freeze does not cause the catalog node to freeze.

10. The method of claim 9, wherein the second data management system includes an out-of-the-box catalog that is not used to provide catalog services.

11. The method of claim 10, wherein the out-of-the-box catalog is configured to be stored and managed on a master node associated with the second data management system.

12. The method of claim 9, wherein the catalog is stored on the catalog node according to a set of system configurations that includes one or more of the following: a property associated with the catalog, an availability guarantee associated with the catalog, and a performance goal associated with the catalog.

13. The method of claim 9, wherein the first request and the second request are each received from one of the following: a boot engine, a query planner, a master node, or a user node.

14. The method of claim 9, wherein the first data management system includes a Greenplum database system and the second data management system includes a Hadoop system.

15. The method of claim 9, wherein the method further includes: in the event a modification to the first system state information causes the boot process on the master node to freeze:
using the catalog node to receive an instruction associated with a manual edit to the first system state information; and
using the catalog node modifying the first system state information as instructed per the instruction associated with the manual edit.

16. The method of claim 9, further comprising using a backup catalog node, that includes an earlier version of the catalog before a modification to the first system state information causes the boot process on the master node to freeze, to provide the first boot engine on the master node with access to the earlier version of the catalog during the boot process of the master node.

17. A computer program product for managing stored objects, the computer program product being embodied in a non-transitory computer readable storage medium and comprising computer instructions for:
using a catalog node to store, on the catalog node in a persistent manner, a catalog comprising one or more metadata objects, wherein:
the one or more metadata objects comprising the catalog include: (1) one or more metadata objects associated with a first data management system and (2) one or more metadata objects associated with a second data management system;
the one or more metadata objects are stored in the catalog in a unified schema; and
a plurality of user nodes includes: (1) a first user node that is configured to store first user data using the first data management system and (2) a second user node that is configured to store second user data using the second data management system;
receiving, at the catalog node, a first request to access a metadata object associated with the first data management system;
receiving, at the catalog node, a second request to access a metadata object associated with the second data management system;
in response to receiving the first and the second request, providing unified access to the requested metadata objects associated respectively with the first and the second data management system including by accessing the catalog and presenting the requested metadata objects in the unified schema;

using a first boot engine on a master node to access, during the boot process of the master node, first system state information in the catalog and stored on the catalog node; and using a second boot engine on the catalog node to access, during the boot process of the catalog node, second system state information different from the first system state information, such that a modification to the first system state information that causes the boot process on the master node to freeze does not cause the catalog node to freeze.

18. The computer program product of claim 17, wherein the second data management system includes an out-of-the-box catalog that is not used to provide catalog services.

19. The computer program product of claim 18, wherein the out-of-the-box catalog is configured to be stored and managed on a master node associated with the second data management system.

20. The computer program product of claim 17, wherein the catalog is stored on the catalog node according to a set of system configurations that includes one or more of the following: a property associated with the catalog, an availability guarantee associated with the catalog, and a performance goal associated with the catalog.

21. The computer program product of claim 17, wherein the first request and the second request are each received from one of the following: a boot engine, a query planner, a master node, or a user node.

22. The computer program product of claim 17, wherein the first data management system includes a Greenplum database system and the second data management system includes a Hadoop system.

23. The computer program of claim 17, wherein the computer program product further includes computer instructions for: in the event a modification to the first system state information causes the boot process on the master node to freeze:
using the catalog node to receive an instruction associated with a manual edit to the first system state information; and
using the catalog node modifying the first system state information as instructed per the instruction associated with the manual edit.

24. The computer program product of claim 17, further comprising computer instructions for using a backup catalog node, that includes an earlier version of the catalog before a modification to the first system state information causes the boot process on the master node to freeze, to provide the first boot engine on the master node with access to the earlier version of the catalog during the boot process of the master node.

* * * * *